E. TAYLOR.
Clothes-Line Fastenings.

No. 150,988. Patented May 19, 1874.

Witnesses,
John Pollitt
Peter McIntyre

Inventor
Edward Taylor
By Wm. E. Simmds, atty

UNITED STATES PATENT OFFICE.

EDWARD TAYLOR, OF ROCKVILLE, CONNECTICUT.

IMPROVEMENT IN CLOTHES-LINE FASTENINGS.

Specification forming part of Letters Patent No. 150,988, dated May 19, 1874; application filed January 17, 1874.

*To all whom it may concern:*

Be it known that I, EDWARD TAYLOR, of Rockville, in the county of Tolland and State of Connecticut, have invented a new and useful Line-Fastening, of which the following is a specification, reference being had to the accompanying drawings, where—

Figure 1:
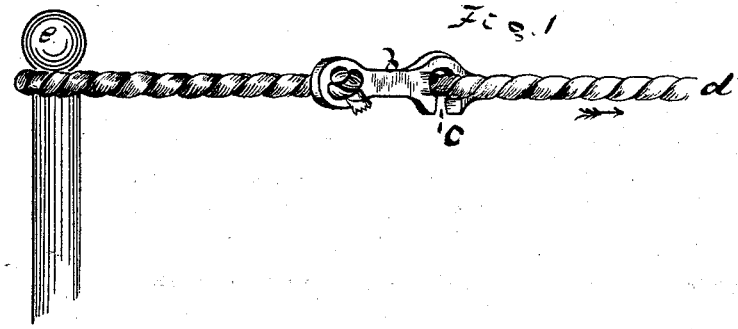
Figure 2:
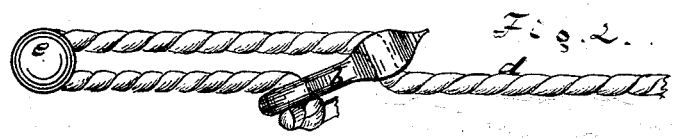
Figure 3:
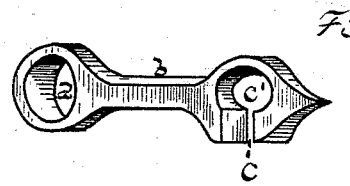

Figure 1 is a side view of the same applied to the purpose for which it is intended. Fig. 2 is a top view of Fig. 1. Fig. 3 is an enlarged perspective view of the fastening.

Its main though not its only use is for fastening the end or ends of a clothes-line. It is made, by preference, of cast metal, as cast-iron. It has an eye, $a$, into which the end of the line is tied or otherwise permanently fastened. It has the body $b$ and the slot or mortise $c$, swelling at the back or rear into the enlargement $c'$, circular in form. The line $d$ being put over or around the post $e$, or its equivalent, the slot $c$ $c'$ is slipped upon the line, as shown in Figs. 1 and 2. The more the line is pulled upon in the direction indicated by the arrow the tighter the line is held and bound in the grasp of the fastener.

The essential parts of this article are an eye, $a$, or its equivalent, wherein to tie the end of the line, the body $b$, and the slot $c$ $c'$, which preferably, but not necessarily, is of the shape shown.

I have been made aware of the clamp made use of in erecting army-tents and the like, which is something like my device, except that it has no opening from the hole through which one of the ropes runs to the side of the clamp, so that such a clamp cannot be readily attached to and detached from a line as can mine, and in some cases it could not be used practically for a line-fastener at all—as, for instance, when the line is to be passed through a ring or staple, or around a pulley hung in a frame; for in such case the end of the rope would have to be tied and untied each time the line was put up, which would make such a clamp a failure for the purposes for which mine is designed, and I do not claim such a clamp as my invention.

I claim as my invention—

As a new manufacture, a line-fastener, having at one end an eye or other means for permanent attachment to a line, and having the side opening $c$, swelling at the rear into an enlargement, $c'$, substantially as shown and described.

EDWARD TAYLOR.

Witnesses:
WM. EDGAR SIMONDS,
JOHN POLLITT.